United States Patent [19]
Iwasaki

[11] Patent Number: 5,187,509
[45] Date of Patent: * Feb. 16, 1993

[54] ILLUMINATION SYSTEM FOR USE IN IMAGE PROJECTION APPARATUS

[75] Inventor: Satoshi Iwasaki, Toyokawa, Japan

[73] Assignee: Minolta Camera Kabushiki Kaisha, Osaka, Japan

[ * ] Notice: The portion of the term of this patent subsequent to Sep. 10, 2008 has been disclaimed.

[21] Appl. No.: 666,053

[22] Filed: Mar. 7, 1991

[30] Foreign Application Priority Data

Mar. 7, 1990 [JP] Japan .................................. 2-57499

[51] Int. Cl.⁵ .......................... G03B 3/02; F21V 5/04
[52] U.S. Cl. .................................. 353/101; 359/689; 359/676; 362/331
[58] Field of Search ..................... 353/85, 86, 87, 100, 353/101, 102, 38; 350/423, 427, 429, 252, 255; 362/335, 277, 268; 359/676, 683, 684, 689

[56] References Cited

U.S. PATENT DOCUMENTS

| | | |
|---|---|---|
| 2,787,935 | 4/1957 | Asao Inoue . |
| 3,222,981 | 12/1965 | Lucas ..................................... 353/38 |
| 3,391,973 | 7/1968 | Laurent ................................. 350/427 |
| 3,628,856 | 12/1971 | Jungjohann et al. . |
| 4,029,956 | 6/1977 | Leibundgut et al. . |
| 4,278,334 | 7/1981 | Maeda . |
| 4,433,906 | 2/1984 | Nakatani et al. . |
| 4,824,223 | 4/1989 | Doctor et al. . |
| 4,825,243 | 4/1989 | Ito et al. . |
| 4,867,545 | 9/1989 | Wakimoto et al. ................... 350/427 |

FOREIGN PATENT DOCUMENTS

296413 7/1929 United Kingdom .

Primary Examiner—William A. Cuchlinski, Jr.
Assistant Examiner—William C. Dowling
Attorney, Agent, or Firm—Price, Gess & Ubell

[57] ABSTRACT

An illumination system for use in an image projection apparatus, having a light source assembly which includes a lamp and a concave reflector for producing convergent light, and an illumination lens group which includes, in order from the light source assembly side, a first lens unit of a negative power movable along the optical axis, a second lens unit of a positive power and a third lens unit of a positive power. The illumination lens group fulfills the following equation, $$\phi 1 + \phi 2 < 0$$

where $\phi 1$ and $\phi 2$ represent the powers of said first and second lens units, respectively.

8 Claims, 4 Drawing Sheets

ILLUMINATION SYSTEM FOR USE IN IMAGE PROJECTION APPARATUS

BACKGROUND OF THE INVENTION

1. Field of the Invention

The present invention relates to illumination systems, and more particularly to an illumination system for use in image projection apparatus such as microfilm readers, microfilm reader-printers and overhead projectors.

2. Description of the Related Art

FIG. 1A shows a source assembly 1 which comprises a lamp 2 and an ellipsoidal reflector 3 disposed behind the lamp 2 and which is generally used in recent years in image projection apparatus such as microfilm readers, microfilm reader-printers and overhead projector. With illumination systems having such a light source 1, the light reflected from the ellipsoidal reflector 3 contributes to the illumination of an original more efficiently than the light traveling from the lamp 2 directly toward the original. As shown in FIG. 1B, the filament 4 of the lamp 2 is disposed at the position of first focus of the ellipsoidal reflector 3, and the light emitted by the filament 4 is reflected at the reflector 3 and concentrated on the position 5 of second focus of the reflector. Use of the ellipsoidal reflector 3 having the light concentrating or focusing action results in the advantage that the condenser lens system subsequently disposed can be simplified. Such ellipsoidal reflectors include one having a perfectly ellipsoidal reflecting surface, and one having a reflecting surface which is basically an ellipsoidal surface and formed by a collection of minute planes.

FIGS. 2A and 2B show a conventional illumination system including a light source assembly 1 having an ellipsoidal reflector 3 (Reader-Printer MFB1100, product of MINNESOTA MINING AND MANUFACTURING CO.). FIG. 2A shows the system wherein a projection lens 6L of low magnification is used, and FIG. 2B shows the system wherein a projection lens 6H of high magnification is used. A filament 4 emits light 7, which is reflected from the ellipsoidal reflector 3 and illuminates a microfilm F held between a pair of holders 9A and 9B. An image of the illuminated microfilm F is projected on a screen (not shown) by the projection lens 6L or 6H.

The light source assembly 1 of the illumination system is basically so designed that the lamp 2 will not block the light from ellipsoidal reflector 3. However, the direct light from the lamp 2 does not substantially contribute to the illumination, for example, owing to the scattering by the top end 2A of the bulb, while the bottom portion of the reflector 3 is not utilized as the reflecting surface because of the setting of the lamp 2, so that a bundle of rays illuminating a point P on the microfilm F has a dark central portion Q and a bright peripheral portion R (see FIGS. 3A and 3B). This phenomenon becomes more pronounced as the f-number of the projection lens increases on the microfilm side to result in an uneven illuminance distribution on the screen. This problem can be solved by making the width D of the bundle of rays on the axis at the right source assembly 1 sufficiently greater than the width d of the central portion Q. This can be realized by inserting a lens of suitable negative refracting power in the bundle of converging rays in the vicinity of the light source assembly 1. For this purpose, the condenser lens system 8 used comprises a negative lens 8L positioned in the vicinity of the light source assembly 1, and a positive Fresnel lens 8F positioned in the vicinity of the microfilm F.

For the illumination system to achieve an improved illumination efficeincy, on the other hand, the system employs Köhler illumination for forming an image of the filament 4 at the pupil position Ent. P of projection lens 6L or 6H on the film F side. Nevertheless, since the projection lenses 6L and 6H differ in the pupil position Ent. P in the focused state, there is a need to alter the position where the image of the filament 4 is to be formed, in accordance with which of the lenses 6L and 6H is used. With the illumination system described, the Fresnel lens 8F close to the microfilm F is therefore shifted axially of the system to thereby alter the position where the image of the filament 4 is to be formed.

However, the prior-art system requires a space for shifting the Fresnel lens 8F which is relatively large and positioned close to the microfilm F, making it difficult to provide a compacted image projection apparatus. Moreover, a large and complex mechanism is needed for shifting the Fresnel lens 8F.

SUMMARY OF THE INVENTION

Accordingly, the main object of the present invention is to provide an illumination system which is adapted to make an image projection apparatus compacted when incorporated therein.

Another object of the present invention is to provide an illumination system adapted to afford a uniform illuminance distribution at all times.

BRIEF DESCRIPTION OF THE DRAWINGS

These and other objects or features of the present invention will become aparent from the following description of a preferred embodiment thereof taken in conjunction with the accompanying drawings, in which.

In the following description, like parts are designated by like reference numbers throughout the several drawings.

DESCRIPTION OF THE PREFERRED EMBODIMENT

An embodiment of the present invention will be described below with reference to the drawings.

Figure 4A:
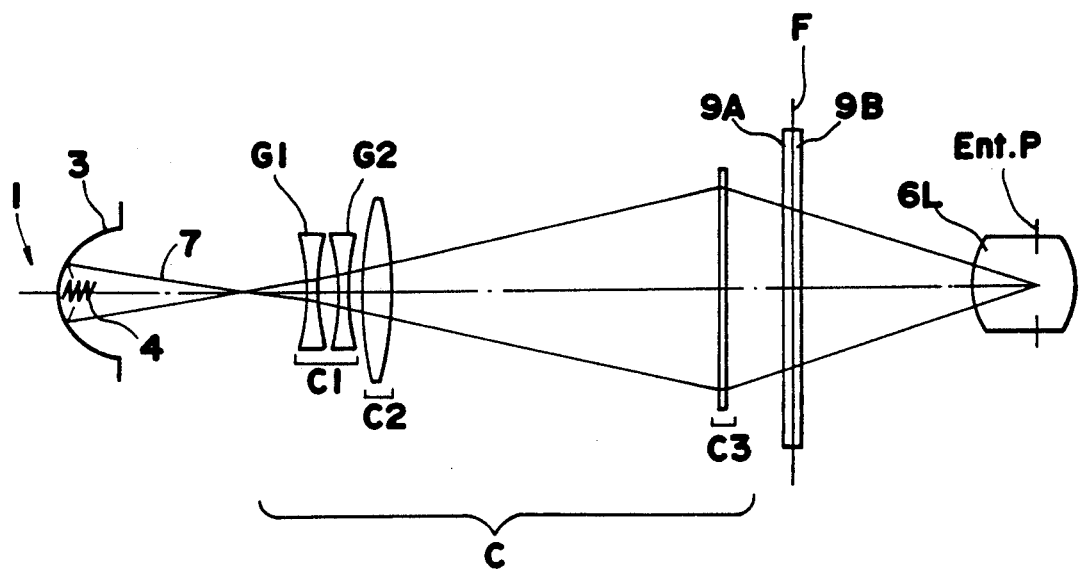
FIGS. 4A and 4B are sectional views showing the construction of an illumination system embodying the invention.
Figure 4B:
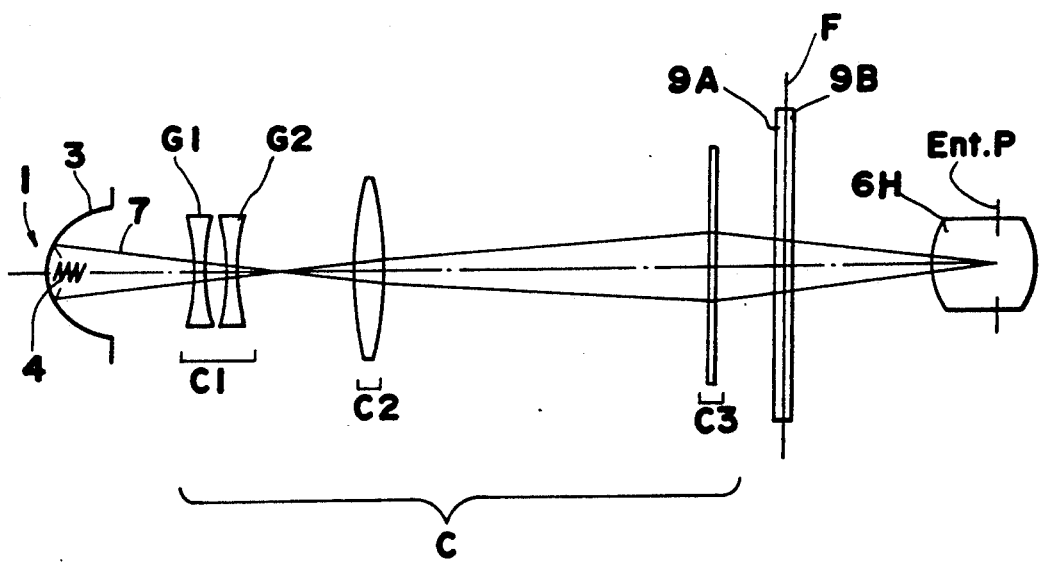

FIGS. 4A and 4B are views showing the construction of an illumination system embodying the present invention. FIG. 4A shows a projection lens 6L of low magnification as used in the system, while FIG. 4B shows a projection lens 6H of high magnification as included in the system.

Light 7 from a filament 4 of a light source assembly 1 is reflected from an ellipsoidal reflector 3 and impinges on a condenser lens system C. The condenser lens system C comprises, as arranged from the light source side toward the projection lens, a first lens unit C1 of negative power, a second lens unit C2 of positive power, and a third lens unit C3 comprising a Fresnel lens of positive power. A microfilm F held between holders 9A and 9B is illuminated with the light through the condenser lens system C, and an image of the microfilm F is projected on a screen by the projection lens 6L or 6H. Furhter to obtain a sufficient illuminance on the screen, the condenser lens system C forms an image of the filament 4 at the pupil position Ent. P of the projection lens 6L or 6H on the film side.

To form the image of the filament 4 at the pupil position Ent. P at all times regardless of the type of projection lens, the first lens unit C1 of the condenser lens unit C is movable in the direction of the optical axis and is positioned in place for the particular projection lens 6L or 6H used. More specifically, the first lens unit C1 is positioned in the vicinity of the second lens unit C2 when the projection lens 6L of low magnification is used (see FIG. 4A), or is positioned as shifted toward the light source assembly 1 when the projection lens 6H of high magnification is used (see FIG. 4B).

Assuming that the first lens unit C1 and the second lens unit C2 are $\phi 1$ and $\phi 2$, respectively, in refracting power, the condenser lens system C satisfies the following conditional inequality (A).

$$\phi 1 + \phi 2 < 0 \tag{A}$$

The inequality (A) represents the requirement for giving a uniform illuminance distribution on the screen and reducing the amount of shift of the first lens unit C1 in the case where the projection lens of low magnification is used. The reduction in the amount of shift of the second lens unit C2 serves to make the shifting mechanism therefor compact.

Each of the lens units C1, C2 and C3 may comprise a single lens or a plurality of lenses.

To avoid the rise in the temperature of the microfilm F, at least one of the first lens unit C1 and the second lens unit C2 constituting the condenser lens system C may be made of heat-absorbing glass.

Although the above embodiment has a straight optical path extending from the light source assembly 1 to the microfilm F, the optical path can be folded using a mirror. The rise in the temperature of the microfilm is avoidable also in this case if the mirror used has heat-transmitting characteristics.

Figure 1B:
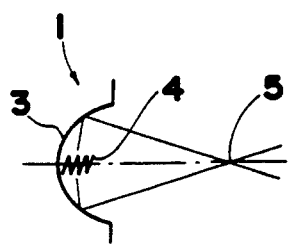
FIGS. 1A and 1B are a perspective view and a sectional view, respectively, showing the construction of a light source assembly in common illumination systems.
Figure 1A:
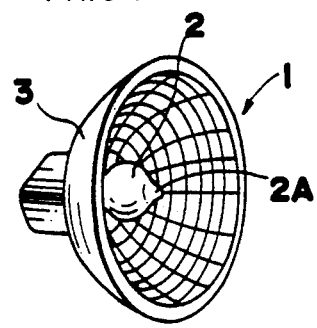
Figure 3A:
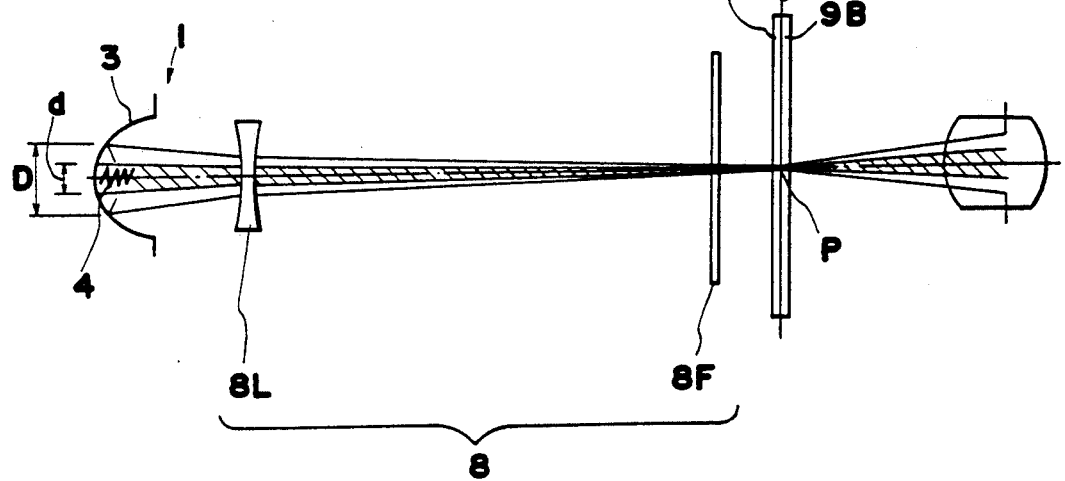
FIGS. 3A and 3B are diagrams illustrating the problem encountered with the light source assembly shown in FIGS. 1A and 1B.
Figure 3B:
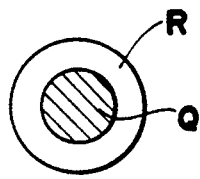
Figure 2A:
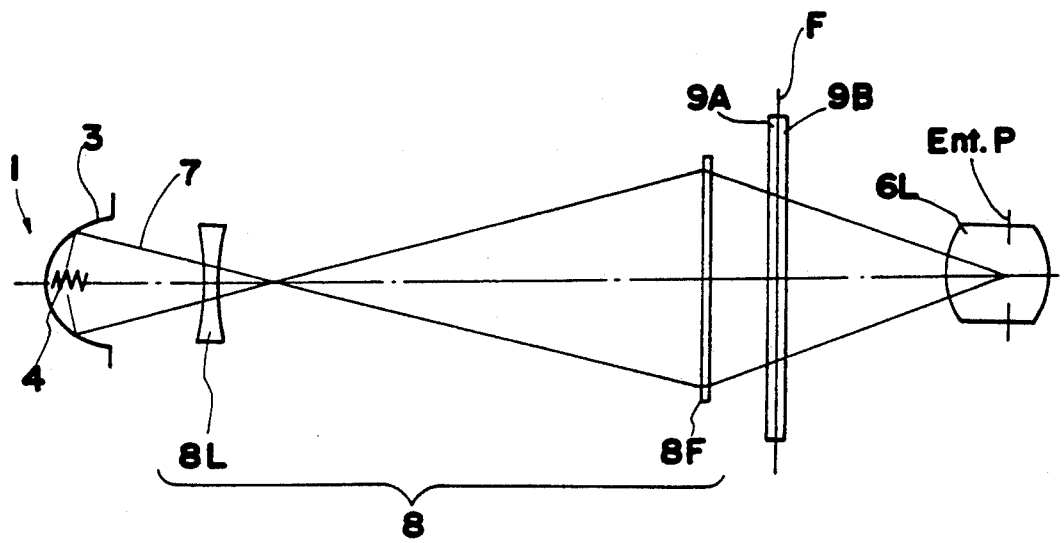
FIGS. 2A and 2B are sectional views showing the construction of a conventional illumination system.
Figure 2B:
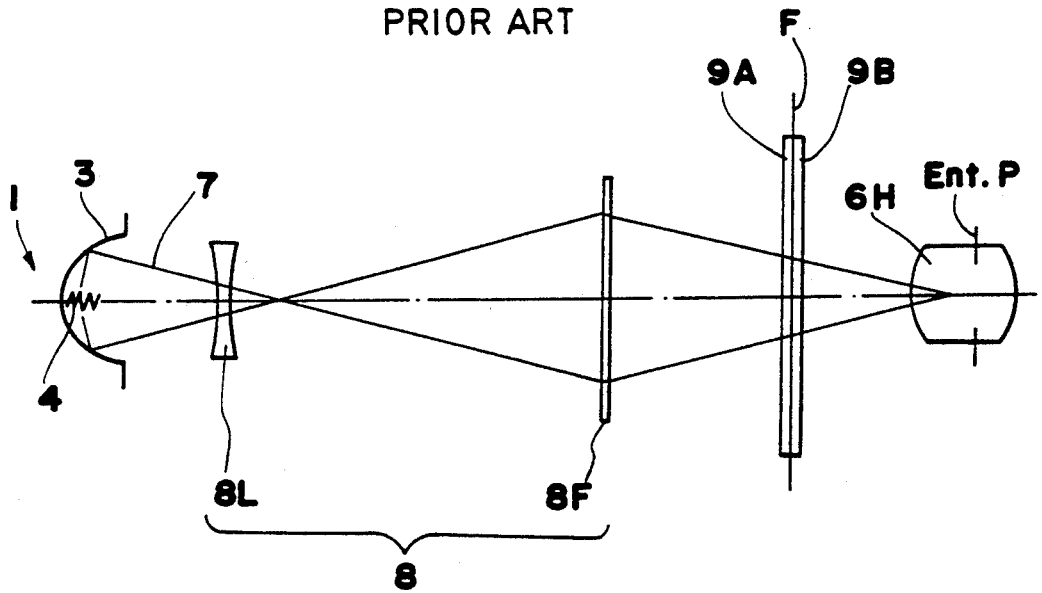

The filament 4 in the light source assembly 1 may be disposed in the vicinity of the position of first focus of the ellipsoidal reflector 3 for the following reason. When the filament 4 is considered to be a point light source, the light emanating from the filament 4 disposed at the position of first focus will be concentrated on the position of second focus 5, whereas the filament 4 actually has a definite size and therefore forms an image of secondary light source of definite size at the position of second focus. With this taken into consideration, the center of the filament 4 need not strictly coincide with the position of first focus. Further the ellipsoidal reflector 3 may be one having a perfectly ellisoidal reflecting surface, or one having a reflecting surface which is basically an ellipsoidal surface and formed by a collection of minute planes as shown in FIG. 1(B).

TABLE 1 below shows a specific example of the present embodiment. With this example, the light source assembly 1 focuses light at a position at a distance of 45 mm from the plane of opening of the ellipsoidal reflector 3. The lens back based on the microfilm surface (pupil position of the projection lens based on the film surface) is 75~71 corresponding to the distance between principal points. The first lens unit C1 has two double concave lenses, the second lens unit C2 is a double convex lens, and the third lens unit C3 is a Fresnel lens having its Fresnel surface directed toward the light source assembly.

TABLE 2 shows more specific numeral values of the example given in TABLE 1 and having a paraxial arrangement. Further, G1 and G2 are lenses of which the first lens unit C1 are composed. G1 represents the lens nearer the light source assembly 1 and G2 represents the lens nearer the second lens unit.

Figure 5:
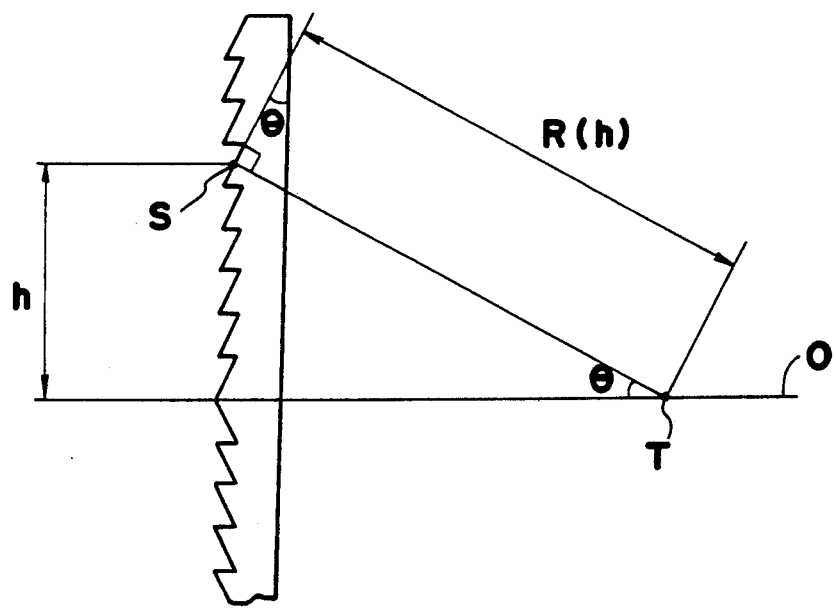
FIG. 5 is a diagram for illustrating the radius of curvature of a Fresnel surface.

With reference to TABLE 2, the second lens unit C2 is made of heat-absorbing glass, and the third lens unit C3 of acrylic resin. The radius of curvature of Fresnel surface marked with an asterisk refers to a coefficient a0 included in the following equation (B) which defines the configuration of the Fresnel surface as shown in FIG. 5.

$$R(h) = a0 + a1h + a2h^2 + a3h^3 \tag{B}$$

wherein in a section containing the optical axis (FIG. 5), R(h) represents the distance between a point S at a height h from the optical axis 0 and the point of intersection, T, of the optical axis with a straight line perpendicular to the Fresnel surface and passing through the point S. When the coefficients a1, a2, a3 of the equation (B) are deter mined for the projection lens to be used, a more suitable illumination system can be obtained.

TABLE 1

|  | Refracting power | Outside diameter | Distance between principal point |
|---|---|---|---|
| Light source assembly (opening of reflector) | — | 45 | |
| | | | 69.9 to 34.9 |
| First lens unit C1 | −0.034114 | 35 | |
| | | | 13.8 to 48.8 |
| Second lens unit C2 | 0.009432 | 55 | |
| | | | 114.5 |
| Third lens unit C3 | 0.016667 | 80 | |
| | | | 22 |
| Microfilm surface | — | | |

TABLE 2

|  | | Radius of curvature | Axial distance | Refractive index |
|---|---|---|---|---|
| Light source assembly (opening of reflector) | | — | | |
| | | | 64.5 to 29.5 | |
| | | −60 | | |
| | G1 | | 3 | 1.472 |
| | | 60 | | |
| First lens unit C1 | | | 7.5 | |
| | | −60 | | |
| | G2 | | 3 | 1.472 |
| | | 60 | | |
| | | | 5 to 40 | |
| | | 110 | | |
| Second lens unit C2 | | | 10 | 1.527 |
| | | −110 | | |
| | | | 111.2 | |
| | | *29.484 | | |
| Third lens unit C3 | | | 2 | 1.491 |
| | | ∞ | | |
| | | | 23 | |

TABLE 2-continued

| | Radius of curvature | Axial distance | Refractive index |
|---|---|---|---|
| Microfilm surface | — | | |

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An illumination system for use in an image projection apparatus, the illumination system illuminating an original which retains an image to be projected, the image projection apparatus having a projection lens unit in an exchangeable manner to project the image of said original onto an image receiving plane with a different magnification, the illumination system comprising:

a light source assembly which emits convergent light to illuminate the original; and an illumination lens group including, as arranged from the light source assembly side, a first lens unit of a negative power which is movable along the optical axis, a second lens unit of a positive power and a third lens unit of a positive power, wherein the illumination lens group fulfills the following equation, $$\phi 1 + \phi 2 < 0$$

where $\phi 1$ and $\phi 2$ represent the powers of said first and second lens units, respectively.

2. An illumination system as claimed in claim 1, wherein said light source assembly comprises a lamp and a concave reflector behind the lamp.

3. An illumination system as claimed in claim 1, wherein said third lens unit comprises a Fresnel lens.

4. An illumination system as claimed in claim 1, wherein said first lens units includes two lens elements each having a negative power.

5. An illumination system for use in an image projection apparatus, comprising:

a light source assembly which emits convergent light;

a first lens unit of a negative power which is located in the vicinity of said light source assembly and movable along the optical axis;

a second lens unit of a positive power which is positioned at the side opposite to said light source assembly with respect to said first lens unit; and a third lens unit of a positive power which is located at the side opposite to said first lens unit with respect to said second lens unit;

wherein the illumination system fulfills the following equation, $$\phi 1 + \phi 2 < 0$$

where $\phi 1$ and $\phi 2$ represent the powers of said first and second lens units, respectively.

6. An illumination system as claimed in claim 5, wherein said light source assembly comprises a lamp and a concave reflector behind the lamp.

7. An illumination system as claimed in claim 5, wherein said third lens unit comprises a Fresnel lens.

8. An illumination system as claimed in claim 5, wherein said first lens units includes two lens elements each having a negative power.

* * * * *